Dec. 19, 1967  R. B. MacKAY  3,358,409
HIGH TEMPERATURE PLASTIC EDGE ATTACHMENT
Filed Oct. 20, 1965
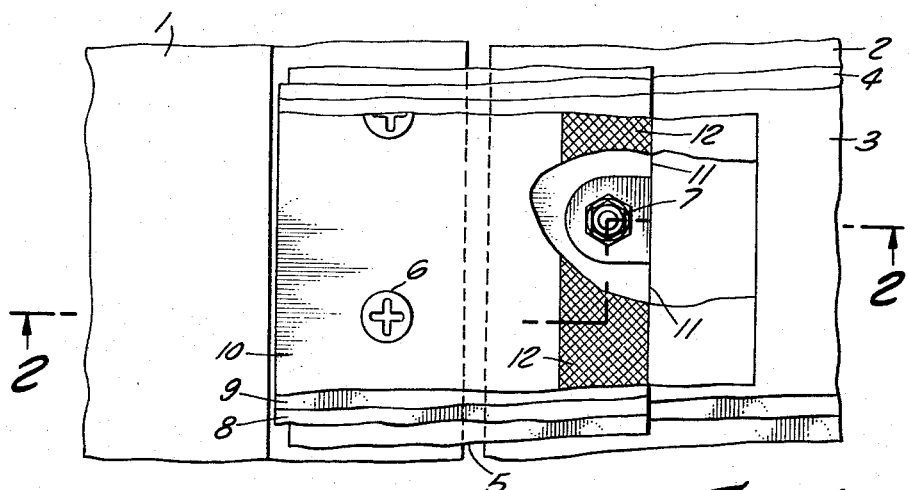
FIG. 1.
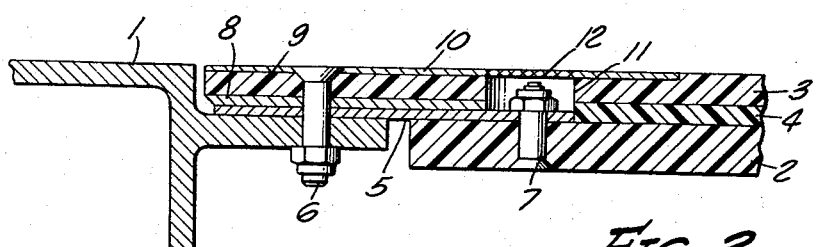
FIG. 2.
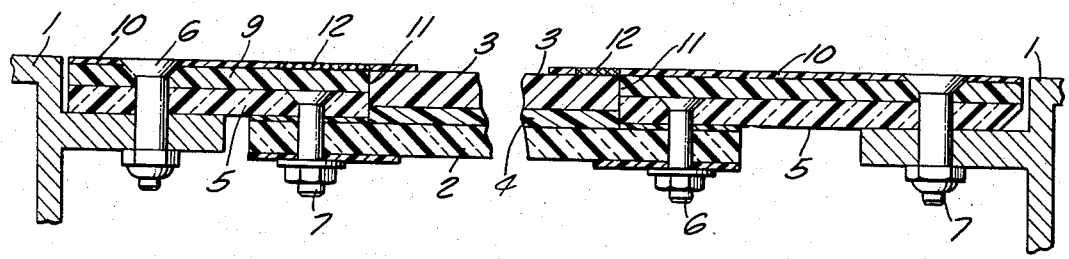
FIG. 3.  FIG. 4.
INVENTOR.
RICHARD B. MacKAY
BY
ATTORNEYS

United States Patent Office 3,358,409
Patented Dec. 19, 1967

3,358,409
HIGH TEMPERATURE PLASTIC EDGE
ATTACHMENT
Richard B. MacKay, Gardena, Calif., assignor to Swedlow, Inc., Garden Grove, Calif., a corporation of California
Filed Oct. 20, 1965, Ser. No. 498,985
11 Claims. (Cl. 52—208)

This invention relates to plastic edge attachments and more particularly, it is concerned with the attachment of heat shielded plastic windshields or canopies to aircraft frames.

Airplane canopies, windows, and the like are commonly made from stretched plastic materials. These streched plastics are tough and yet resist shattering and cracking. However, such plastic window materials have an expansion rate much greater than that of the customary metal airplane frame. Thus when the aircraft cabin is pressurized, the plastic window material expands to a greater degree than the frame. It is thus necessary to attach the plastic window to the airplane frame in such a way as to obtain a satisfactory pressure seal and yet distribute the stresses from the plastic window or canopy to the frame while providing for expansion of the window.

The prior art edge attachments have not been completely acceptable. Typical prior art edge attachments are shown in U.S. Patent 2,696,451 to Snyder and U.S. Patent 2,511,168 to Martin et al. In both cases, a reinforced plastic sheet is bonded to the window sheet material and this reinforced sheet is secured to the aircraft frame by mechanical means such as bolts. The principal drawback of such an attachment is the excessive thickness build-up necessary to carry the high loads at elevated temperatures imposed by the requirements of high speed aircraft. The prior art has also employed cement type joints either with or without supplemental mechanical attachment to carry the loads from the plastic to the aircraft frame.

It is an object of this invention to eliminate glue or adhesive bonds in the edge attachment and replace them with strong mechanical means of attachment. Another object of the invention is to provide an edge attachment of reduced thickness. A further object of the invention is to provide a means for expansion take-up in the window to frame joint.

The invention can be more fully understood by reference to the accompanying drawings.

FIGURE 1 is a fragmentary front or side elevation showing a portion of the airplane fuselage and plastic window constructed according to the present invention.

FIGURE 2 is a fragmentary section taken along the line 2—2 of FIGURE 1 showing the preferred form of mounting the window on the airplane frame.

FIGURES 3 and 4 are fragmentary sections showing alternative forms of edge attachment according to the present invention.

A portion of the fuselage 1 is shown at the left of FIGURE 1. The fuselage and frame may be aluminum or any other suitable material. The structural plastic ply 2 which forms the window or enclosure lies in the same plane as the fuselage but is not connected directly to it. A plastic material suitable for an aircraft window is a stretched acrcylic polymer such as methyl methacrylate. Any other suitable plastic material may be used. The window 2 is shielded from heat by a plastic heat shield material 3. A preferred heat shield material is as cast acrylic polymer. Other suitable materials may also be used. The heat shield is bonded to the window sheet by an inter layer 4.

The window sheet is secured to the frame of the aircraft by means of strap 5. In the drawings the means of attachment of strap 5 to window 2 and frame 1 is represented as a nut and bolt attachment 6. Any other convenient form of mechanical attachment may be used. A principal advantage of this attachment over the prior art is that it avoids the necessity of an adhesive or glue bond in the joining of window material 2 to frame 1. Strap 5 may advantageously be fabricated from metal but other suitable structural materials such as resin impregnated glass fibers may also be used.

Strap 5 is protected from heat by a shield such as a laminate comprising several layers of heat resistant material. A laminate consisting of three layers, 8, 9, and 10, is shown in the drawing. Mechanical attaching means 6 and 7 may be employed to secure the heat shield to the frame. One or more plies of the laminated heat shield may overlap the window heat shield 3 and be bonded to it.

In a preferred embodiment of the invention, illustrated by FIGURE 2, means are provided to maintain a strong, heat resistant joint when the window expands while strap 5 remains essentially unchanged. Upon expansion of the window, a gap will form at butt joint 11 which is not bonded. The outer layer 10 of the laminated heat shield protects the otherwise exposed area of strap 5. In order for outer layer 10 to expand sufficiently to cover the gap formed at 11, it is necessary that a portion 12 of the outer layer 10, which either is overlying or is adjacent to the joint 11, be unbonded to the layer of heat shield below it. Thus the unbonded portion of outer layer 10 can expand independently of heat shield material 3 and 9. As shown in FIGURE 2, the unbonded layer overlies the layer of laminated heat shield 9 adjacent to the joint 11.

FIGURE 3 illustrates an alternative form of the invention. An alternative form of placement for bolt 7 secures the window to the connecting strip.

FIGURE 4 illustrates an alternative form of the expansion take-up area. The unbonded portion of the outer layer of laminated heat shield 10 overlies window 3 rather than the lower layer of the laminated heat shield. This arrangement allows for expansion in a manner similar to the expansion take-up illustrated in FIGURE 2.

FIGURES 2, 3, and 4 indicate the importance of placing the unbonded expansion take-up area of outer layer 10 above the butt joint 11. The expansion take-up provision is especially necessary for loads of greater than 500 pounds per inch of width of lateral surface. In order for the upper layer 10 of the laminate to properly expand, it must be formed from a material having an elastic property, e.g., a cloth or film containing nylon, Mylar, Teflon, Dacron, polypropylene, polycarbonate, Orlon, etc.

As indicated the mechanical fastening means such as bolts can be protected from heat as in the case of means 7 by placing the upper layer 10 of the heat shield laminate over the end of the bolt and nut, or as in the case of means 6 by providing a bolt with a heat resistant head.

From the foregoing description, it can be seen that the invention in its broader aspects is an edge attachment comprising a plastic window and an airplane frame joined by a strap which is mechanically attached to both the window and the frame. A further aspect of the invention is a heat shield for the strap which is provided with a means of allowing for expansion of the window material relative to the strap.

Having fully described my invention, it is to be understood that I do not wish to be limited to the details set forth, but my invention is of the full scope of the appended claims.

I claim:

1. A high temperature edge attachment for aircraft comprising a plastic window sheet and a connecting strap mechanically secured to said window sheet and having means for mechanically securing said connecting strap to an aircraft frame, said window sheet being protected by a heat shield comprising a sheet of temperature resistant plastic material bonded to the window and said strap protected from high temperatures by a heat shield bonded to said strap and overlying the window heat shield and being bonded thereto.

2. The edge attachment of claim 1 wherein the window comprises a stretched acrylic polymer and the heat shield comprises an as cast acrylic polymer.

3. The edge attachment of claim 1 wherein the connecting strap is metal.

4. The edge attachment of claim 1 wherein the connecting strap is composed of resin impregnated glass fibers.

5. The edge attachment of claim 1 wherein said heat shield for the connecting strap is a nylon epoxy laminate.

6. An aircraft window comprising a transparent plastic window sheet, a connecting strap for mounting the window on an aircraft frame, a heat shield for the window, and a heat shield for the connecting strap, the connecting strap being mechanically attached to the window and having means for mechanical attachment of the strap to an aircraft frame, the window heat shield being attached to the outer surface of the window and the connecting strap heat shield being attached to the outer surface of the connecting strap and comprising a laminate of at least two layers of heat-resistant material, the outer layer of said laminate overlying the window heat shield and being bonded thereto and the inner layers of the connecting strap heat shield lying approximately in the same plane as the window heat shield so that the edge of the window heat shield forms an unbonded butt joint with the connecting strap heat shield.

7. The combination of claim 6 wherein a means is provided for expansion of the window, said expansion means comprising a portion of the inner surface of the outer layer of the connecting strap heat shield laminate which overlies the butt joint between the window heat shield and the inner layers of the connecting strap heat shield, said overlying portion being unbonded to both the adjacent layer of the connecting strap heat shield and the window heat shield.

8. The combination of claim 6 wherein the unbonded portion of the outer layer is adjacent to the butt joint and above the lower layers of the connecting strap heat shield.

9. The combination of claim 6 wherein the unbonded portion of the outer layer is adjacent to the butt joint and above the window heat shield.

10. The combination of claim 7 wherein the laminate outer layer is a material selected from the group consisting of nylon, Mylar, Teflon, Dacron, polypropylene, polycarbonate, and Orlon.

11. The combination of claim 7 wherein the outer layer is a nylon epoxy laminate.

References Cited
UNITED STATES PATENTS

| | | | |
|---|---|---|---|
| 2,511,168 | 6/1950 | Martin et al. | 161—44 |
| 2,834,998 | 5/1958 | Wilder | 52—208 |

KENNETH DOWNEY, *Primary Examiner.*